(12) United States Patent
Maglalang

(10) Patent No.: US 11,296,868 B1
(45) Date of Patent: Apr. 5, 2022

(54) METHODS AND SYSTEM FOR COMBATING CYBER THREATS USING A RELATED OBJECT SEQUENCE HASH

(71) Applicant: Trend Micro Incorporated, Tokyo (JP)

(72) Inventor: Ardin Christopher C. Maglalang, Bulacan (PH)

(73) Assignee: Trend Micro Incorporated, Tokyo (JP)

( * ) Notice: Subject to any disclaimer, the term of this patent is extended or adjusted under 35 U.S.C. 154(b) by 357 days.

(21) Appl. No.: 16/573,357

(22) Filed: Sep. 17, 2019

(51) Int. Cl.
*H04L 29/06* (2006.01)
*H04L 9/06* (2006.01)
*H04L 9/32* (2006.01)

(52) U.S. Cl.
CPC .......... *H04L 9/0643* (2013.01); *H04L 9/0637* (2013.01); *H04L 9/3236* (2013.01)

(58) Field of Classification Search
CPC . H04L 63/14; H04L 63/1408; H04L 63/1416; H04L 63/1425; H04L 63/1433; H04L 9/0643; H04L 9/0637; H04L 9/3236; G06F 21/55; G06F 21/552; G06F 21/554; G06F 21/556; G06F 21/56; G06F 21/561; G06F 21/562; G06F 21/563; G06F 21/564; G06F 21/565; G06F 21/566; G06F 21/567; G06F 21/568
See application file for complete search history.

(56) References Cited

U.S. PATENT DOCUMENTS

| | | |
|---|---|---|
| 4,309,569 A | 1/1982 | Merkle |
| 7,039,702 B1 | 5/2006 | Churchyard |
| 7,203,744 B1 | 4/2007 | Parekh et al. |
| 7,694,150 B1 | 4/2010 | Kriby |
| 8,205,258 B1 | 6/2012 | Chang et al. |
| 8,230,262 B2 | 7/2012 | Li et al. |
| 8,424,091 B1 | 4/2013 | Su et al. |
| 8,966,267 B1 | 2/2015 | Pahl et al. |
| 9,104,864 B2 | 8/2015 | Penton et al. |
| 9,117,078 B1 | 8/2015 | Chien et al. |
| 9,255,730 B2 | 2/2016 | Lee et al. |
| 9,705,856 B2 | 7/2017 | Gehrmann et al. |
| 9,894,085 B1 | 2/2018 | Dmitriyev |
| 10,061,921 B1 | 8/2018 | Chang et al. |
| 10,356,119 B1 | 7/2019 | Chang |
| 10,417,416 B1 | 9/2019 | Chang et al. |
| 10,491,627 B1 * | 11/2019 | Su ........................ H04L 63/1416 |

(Continued)

OTHER PUBLICATIONS

Ashish Kundu and Elisa Bertino, "On Hashing Graphs" 2012, pp. 1-16, IBM T J Watson Research Center, New York and Dept. of Computer Science and CERIAS, Purdue University, West Lafayette.

*Primary Examiner* — Malcolm Cribbs
(74) *Attorney, Agent, or Firm* — Patrick D. Benedicto

(57) ABSTRACT

A cyber threat intelligence of a cyber threat includes a threat chain that describes objects involved in the cyber threat and relationships between the objects. A related object hash of an object is calculated by calculating a hash of one or more objects that are linked to the object as indicated in the cyber threat intelligence. A related object sequence hash of the threat chain is generated by calculating a total of the related object hashes. The related object sequence hash of the threat chain is compared to a related object sequence hash of another threat chain to detect cyber threats.

17 Claims, 9 Drawing Sheets

(56) References Cited

U.S. PATENT DOCUMENTS

| | | |
|---|---|---|
| 2003/0163697 A1 | 8/2003 | Pabla et al. |
| 2004/0002384 A1 | 1/2004 | Multerer et al. |
| 2010/0229239 A1 | 9/2010 | Rozenberg et al. |
| 2013/0198841 A1 | 8/2013 | Poulson et al. |
| 2013/0219492 A1 | 8/2013 | Call et al. |
| 2014/0215616 A1 | 7/2014 | Bhatt et al. |
| 2015/0082441 A1 | 3/2015 | Gathala et al. |
| 2016/0012224 A1 | 1/2016 | Zhou et al. |
| 2016/0277423 A1 | 9/2016 | Apostolescu et al. |
| 2016/0285897 A1 | 9/2016 | Gantman et al. |
| 2016/0337387 A1 | 11/2016 | Hu et al. |
| 2017/0171230 A1 | 6/2017 | Leiderfarb et al. |
| 2017/0270299 A1 | 9/2017 | Kim et al. |
| 2018/0176108 A1* | 6/2018 | Llagostera .......... H04L 43/0817 |
| 2018/0181750 A1 | 6/2018 | Lamothe-Brassard |
| 2019/0081963 A1* | 3/2019 | Waghorn ............ H04L 63/1441 |

* cited by examiner

METHODS AND SYSTEM FOR COMBATING CYBER THREATS USING A RELATED OBJECT SEQUENCE HASH

BACKGROUND OF THE INVENTION

1. Field of the Invention

The present invention relates generally to cybersecurity, and more particularly but not exclusively to methods and systems for combating cyber threats.

2. Description of the Background Art

Hashes are typically employed in cybersecurity applications to identify malicious objects, such as files. For example, a hash of a target (i.e., being evaluated) file may be calculated using a Secure Hash Algorithm 1 (SHA1) function. The hash of the target file may be compared to hashes of known malicious files to determine if the target file is malicious. Although effective in detecting particular malicious objects, the conventional hash comparison solution does not allow for detection of more-complex cyber threats that involve multiple objects.

SUMMARY

In one embodiment, a cyber threat intelligence of a cyber threat includes a threat chain that describes objects involved in the cyber threat and relationships between the objects. A related object hash of an object is calculated by calculating a hash of one or more objects that are linked to the object as indicated in the cyber threat intelligence. A related object sequence hash of the threat chain is generated by calculating a total of the related object hashes. The related object sequence hash of the threat chain is compared to a related object sequence hash of another threat chain to detect cyber threats.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
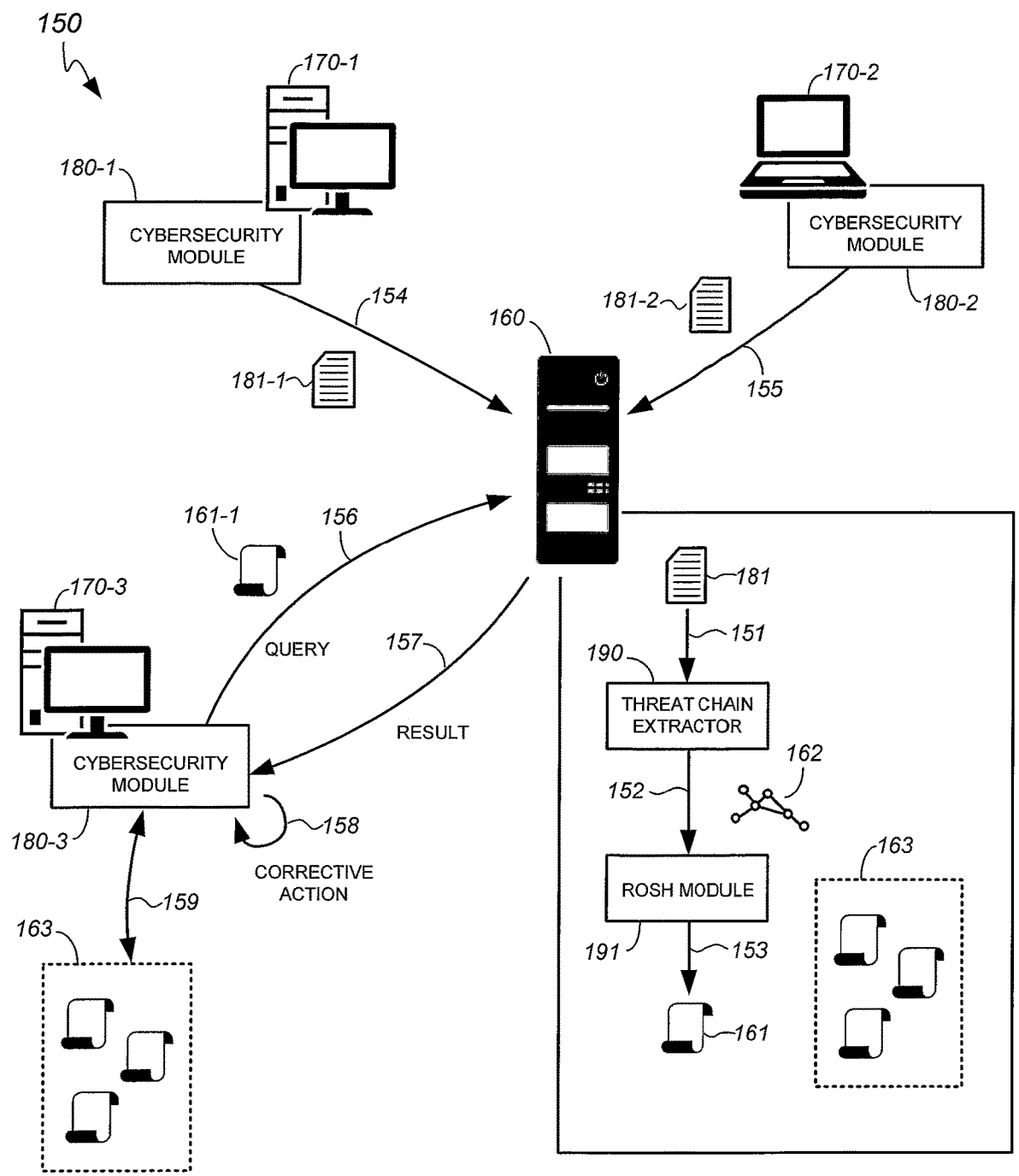
FIG. 1 shows a logical diagram of a system for combating cyber threats in accordance with an embodiment of the present invention.

FIG. 1 shows a logical diagram of a system 150 for combating cyber threats in accordance with an embodiment of the present invention. In the example of FIG. 1, the system 150 includes a cyber threat intelligence analysis system 160 that works in conjunction with one or more cybersecurity modules 180 (i.e., 180-1, 180-2, . . . ) that run on corresponding host computers 170 (i.e., 170-1, 170-2, . . . ). The analysis system 160 and host computers 170 may communicate over the Internet and other computer networks.

A host computer 170 may comprise a server computer, laptop computer, a desktop computer, a security appliance, or other computing device that runs a cybersecurity module 180, which in the example of FIG. 1 is implemented in software. A cybersecurity module 180 may be configured to detect a cyber threat, such as computer viruses, Trojans, phishing, advanced persistent threats, and so on. The cybersecurity module 180 may be configured to perform monitoring to detect cyber threats and to gather cyber threat intelligence pertaining to the cyber threats. As its name implies, cyber threat intelligence comprises information pertaining to cyber threats, such as objects and relationships between objects involved in the cyber threats. The cybersecurity module 180 may perform cyber threat detection and cyber threat intelligence gathering using conventional algorithms employed in the cybersecurity field without detracting from the merits of the present invention.

An object, in the context of cyber threat intelligence, may include an actor (e.g., process or user identifier), a location (e.g., Internet Protocol address), target, procedure, indicators (e.g., filename, process name, path, registry, etc.), and other data involved in a cyber threat. Objects and relationships between objects may have predefined identifiers and reporting format. Each object may have a value, for which a hash may be calculated.

In one embodiment, a cybersecurity module 180 gathers and formats cyber threat intelligence in accordance with the Structured Threat Information Expression (STIX™) convention. Generally speaking, STIX™ is an open-source language and serialization format for facilitating exchange of cyber threat intelligence. With the STIX™ convention, aspects of suspicion, compromise, and attribution can be represented with objects and descriptive relationships. As can be appreciated, other cyber threat intelligence formatting conventions may also be employed without detracting from the merits of the present invention. In the example of FIG. 1, for interoperability, the components of the system 150 employ the same cyber threat intelligence formatting convention.

In the example of FIG. 1, a cybersecurity module 180 provides the analysis system 160 a cybersecurity report 181, which includes cyber threat intelligence gathered by the cybersecurity module 180 at the corresponding host computer 170. As a particular example, the cybersecurity module 180-1 that is running on the host computer 170-1 provides a cybersecurity report 181-1 to the analysis system 160 (see arrow 154). Similarly, the cybersecurity module 180-2 that is running on the host computer 170-2 provides a cybersecurity report 181-2 to the analysis system 160 (see arrow 155).

The analysis system 160 may comprise a server computer and associated software that are configured to receive cyber threat intelligence, parse the cyber threat intelligence for a threat chain, and generate a related object sequence hash of the threat chain. The analysis system 160 may include a threat chain extractor 190 and a related object sequence hash (ROSH) module 191, which in the example of FIG. 1 are both implemented in software.

In one embodiment, the threat chain extractor 190 is configured to receive a cybersecurity report 181 (see arrow 151) and parse the cyber threat intelligence included in the report 181 for a threat chain 162 (see arrow 152). The threat chain extractor 190 may be configured to identify, from the cyber threat intelligence, objects that are involved in a cyber threat and relationships between the objects in accordance with the cyber threat intelligence formatting convention employed (e.g., STIX™ convention). A threat chain 162 may comprise a plurality of objects that are linked by edges, with each edge between two objects representing the relationship between the two objects. To facilitate visualization by a cybersecurity expert for analysis, the threat chain extractor 190 may be configured to display the threat chain 162 as a graph on a display screen of the analysis system 160. The threat chain 162 may also be represented as a data structure for further processing, such as for input to the ROSH module 191.

The threat chain 162 may be analyzed to determine if the threat chain 162 actually describes a cyber threat. For example, the threat chain 162 may be analyzed by cybersecurity experts of Trend Micro, Incorporated or other cybersecurity vendors. A cybersecurity expert may analyze the threat chain 162 using various tools and resources that are generally available to experts in the field of cybersecurity. A threat chain 162 that has been verified to be a cyber threat is also referred to as a malicious threat chain.

In one embodiment, the ROSH module 191 is configured to receive the threat chain 162, and calculate an ROSH 161 of the threat chain 162. As previously noted, the threat chain 162 may comprise a plurality of linked-objects. The ROSH module 191 may generate an ROSH 161 of a threat chain 162 by calculating a related object hash of each object of the threat chain 162, and calculating a total of the related object hashes.

A first object has a direction relative to a second object, based on the relationship between the first and second objects. The first object has an inward relationship with the second object when the relationship between the first and second objects is represented by an edge that points towards the second object. Conversely, the first object has an outward relationship with the second object when the relationship between the first and second objects is represented by an edge that points away from the second object. The direction of an edge indicates which object is acting upon which object.

Examples of relationships between objects include "target" (e.g., when the first object targets the second object), "indicates" (e.g., when the first object indicates the second object), "attributed-to" (e.g., when the first object is attributed to the second object), "uses" (e.g., when the first object uses the second object to perform an action), "created-by" (e.g., when the first object was created by the second object), "related-to" (e.g., when the first object is related to the second object), "derived-from" (e.g., when the first object was derived from the second object), etc. In the preceding relationship examples, the edge is from the first object and goes towards the second object in the threat chain. In other words, the first object acts upon the second object.

As a further example, the relationship of the first object that is "attributed to" the second object may be represented in a threat chain as an edge that goes from the first object towards the second object. In that example, the first object has an inward relationship with the second object, but the second object has an outward relationship with the first object. The relationships between objects and direction of the edges that represent the relationships in a threat chain depend on the cyber threat intelligence formatting convention that is employed.

In one embodiment, the analysis system 160 is configured to form one or more clusters 163 of malicious ROSHs 161. Advantageously, clustering the malicious ROSHs 161 facilitates detection of malicious threat chains 162. As a particular example, the cybersecurity module 180-3 may detect a potential cyber threat on the host computer 170-3, gather cyber threat intelligence of the potential cyber threat, and generate an ROSH 161-1 of the cyber threat intelligence. The ROSH 161-1 may be generated from the threat chain of the cyber threat intelligence, as in the manner previously described. However, in this example, the host computer 170-3 does not have the resource to know if the threat chain describes an actual cyber threat.

The host computer 170-3 may send the ROSH 161-1 to the analysis system 160 (see arrow 156) to determine whether or not the ROSH 161-1 is malicious. The host computer 170-3 may send the ROSH 161-1 to the analysis system 160 as part of a query. In response to the query, the analysis system 160 may search the cluster 163 for a malicious ROSH that matches the ROSH 161-1. The analysis system 160 may return a positive result when the ROSH 161-1 matches a malicious ROSH, i.e., the ROSH 161-1 is detected to be malicious. Otherwise, the analysis system 160 may return a negative result when the ROSH 161-1 does not match a malicious ROSH.

In the example of FIG. 1, the analysis system 160 returns the result of the query (see arrow 157) to the host computer 170-3. The cybersecurity module 180-3 may be configured to perform a corrective action (see arrow 158) when the result indicates that the ROSH 161-1, and thus the corresponding threat chain, is malicious. The corrective action may include sending an alert to an administrator of the host computer 170-3. As can be appreciated, the corrective action may vary depending on the particulars of the cyber threat described by the malicious threat chain.

Because an ROSH 161 is relatively small in size, malicious ROSHs 161 may be stored in host computers 170 to perform local cyber threat detection. For example, to save network bandwidth, the host computer 170-3 may first check a locally-stored cluster 163 to determine if the ROSH 161-1 is malicious (see arrow 159). The host computer 170-3 may thereafter send the ROSH 161-1 to the analysis system 160 when the locally-stored cluster 163-1 does not have a malicious ROSH that matches the ROSH 161-1.

FIGS. 2-6 schematically illustrate a method of generating a related object sequence hash of a threat chain in accordance with an embodiment of the present invention. The method of FIGS. 2-6 may be performed by the ROSH module 191 to generate an ROSH 161 of a threat chain 162.

Figure 2:
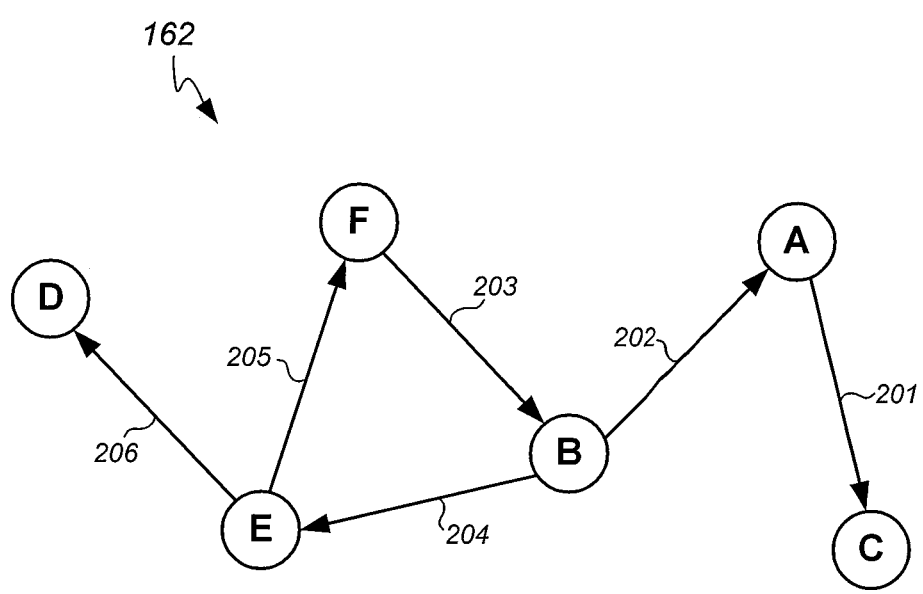
FIGS. 2-6 schematically illustrate a method of generating a related object sequence hash of a threat chain in accordance with an embodiment of the present invention.

FIG. 2 shows a threat chain 162 in accordance with an embodiment of the present invention. In the example of FIG. 2, the threat chain 162 has objects A through F that are involved in a cyber threat, with each object being a node of the threat chain 162. Two objects of the threat chain 162 are directly connected by an edge, which indicates the relationship between the two objects as described in the corresponding cyber threat intelligence. In the example of FIG. 2, the threat chain 162 has edges 201 to 206. As can be appreciated, the threat chain 162 may have fewer or more objects depending on the particulars of the cyber threat.

In one embodiment, the ROSH module 191 calculates a related object hash Z for each object of a threat chain. The related object hash Z for a particular object may be calculated as a combination of the total of hashes of inward objects relative to the particular object and the total of hashes of outward objects relative to the particular object. More particularly, a related object hash Z for a particular object may be calculated as, $$Z = \text{hash}(\text{inward}:\text{outward}) \quad \text{(EQ. 1)}$$

with "hash( )" being a hash function (e.g., SHA1 function), "inward" being the total of hashes of all objects that have an inward relationship with the particular object, and "outward" being the total of hashes of all objects that have an outward relationship with the particular object. In EQ. 1, the hash function may be any suitable conventional hash function, such as the SHA1 function or other cryptographic hash function.

Generally speaking, a hash of an object may be calculated by inputting the value of the object into the hash function. The total of the hashes of all inward objects (i.e., objects that have an inward relationship with the particular object) may be calculated as, $$\text{inward} = I1 + I2 + I3 + \ldots + In \quad \text{(EQ. 2)}$$

with I1 being the hash of a first object that has an inward relationship with the particular object, I2 being the hash of a second object that has an inward relationship with the particular object, and so on.

Similarly, the total of the hashes of all outward objects (i.e., objects that have an outward relationship with the particular object) may be calculated as, $$\text{outward} = O1 + O2 + O3 + \ldots + On \quad \text{(EQ. 3)}$$

with O1 being the hash of a first object that has an outward relationship with the particular object, O2 being the hash of a second object that an outward relationship with the particular object, and so on.

In calculating the related object hash Z of a particular object, the total of the inward hashes (i.e., "inward" of EQ. 2) and the total of the outward hashes (i.e., "outward" of EQ. 3) may be combined together, such as by concatenating the totals to form a single value. In the example of EQ. 1, the operator ":" between the total inward hashes and the total outward hashes indicates a concatenation operation.

Figure 3:
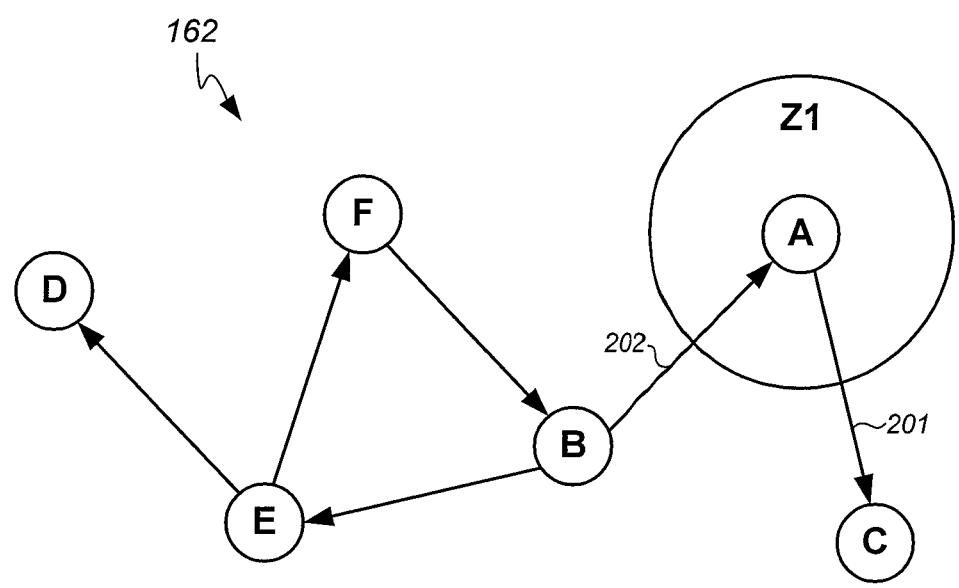

FIG. 3 shows a related object hash Z1 of object A of the threat chain 162 in accordance with an embodiment of the present invention. In the example of FIG. 3, object A is an exploit (e.g., as discussed in the Microsoft™ security bulletin MS17-010), object B is a process at an Internet Protocol (IP) address, and object C is another IP address. The edge 202 represents a "uses" relationship, indicating that the process of object B uses the exploit that has been identified as object A to send network traffic. The edge 201 represents a "targets" relationship, indicating that the network traffic from object B that used the exploit of object A "targets" (i.e., sending to) the IP address of object C.

In the example of FIG. 3, object B has an inward relationship with object A, and object C has an outward relationship with object A. Accordingly, the total inward hash for object A is simply the hash of object B, and the total outward hash for object A is simply the hash of object C. The related object hash Z1 of object A may thus be calculated as, $$Z1 = \text{Hash}(\text{Hash}(B):\text{Hash}(C)) \quad \text{(EQ. 4)}$$

Figure 4:
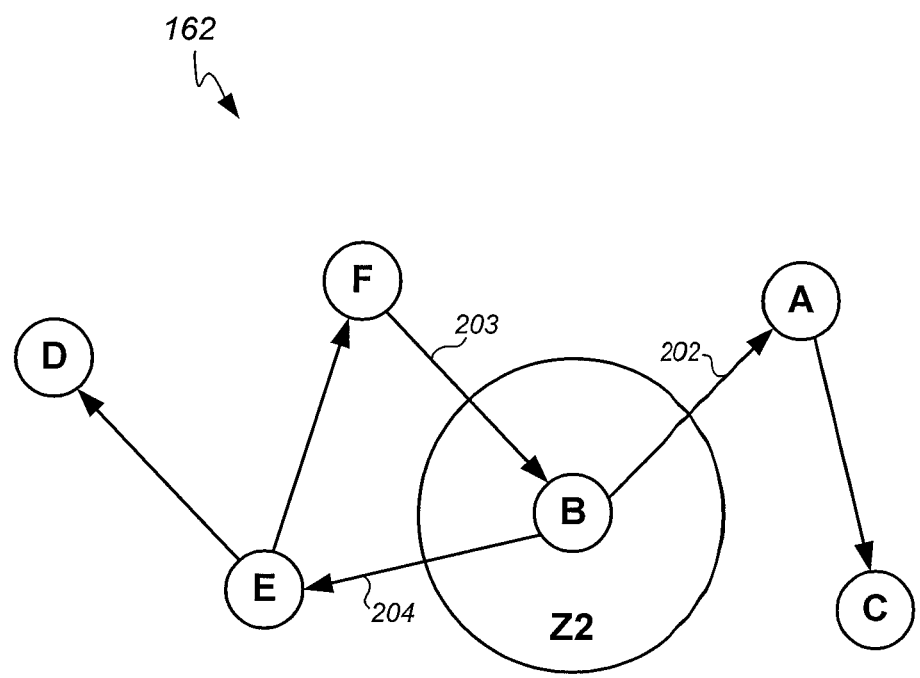

A related object hash of each object of the threat chain 162 is similarly calculated. FIG. 4 shows a related object hash Z2 of object B of the threat chain 162 in accordance with an embodiment of the present invention. In the example of FIG. 4, object F is observed data that has been created by object B, and object E is a process (e.g., process of an executable file). The edge 203 represents a "created-by" relationship, indicating that object F was created by object B. The edge 204 represents a "related-to" relationship that indicates object B is related to object E.

In the example of FIG. 4, object A has an outward relationship with object B, object E has an outward relationship with object B, and object F has an inward relationship with object B. Therefore, the total of all inward hashes relative to object B may be calculated as, $$\text{inward} = \text{hash}(F) \quad \text{(EQ. 5)}$$

and the total of all outward hashes relative to object B may be calculated as, $$\text{outward} = \text{hash}(E) + \text{hash}(A) \quad \text{(EQ. 6)}$$

The related object hash Z2 of object B may be calculated as, $$Z2 = \text{hash}(\text{inward}:\text{outward})$$

where "inward" is the result of EQ. 5, and "outward" is the result of EQ. 6.

Figure 5:
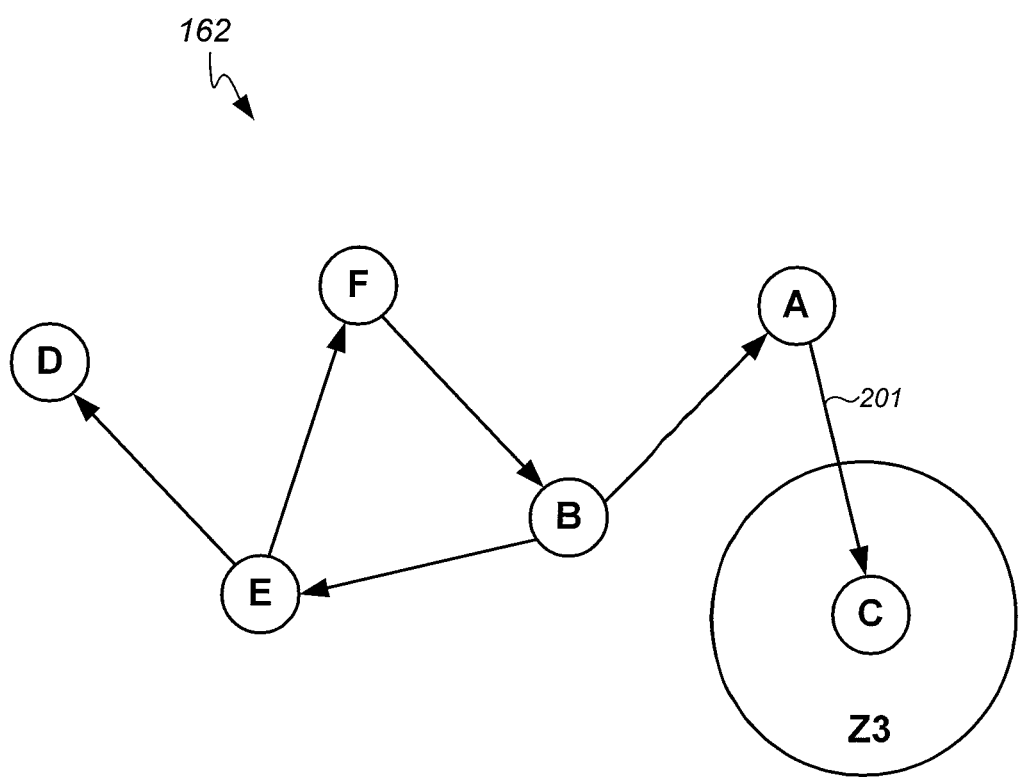

It is possible that an object of a threat chain does not have an inward object or an outward object. This case is illustrated in FIG. 5, where object A has an inward relationship with object C, and there is no object with an outward relationship with object C. The related object hash Z3 of object C is thus, $$Z3 = \text{hash}(\text{hash}(A):0)$$

with "0" indicating that there is no outward object relative to object C.

The related object hash Z of each object of a threat chain is calculated, and the ROSH of the threat chain may be calculated as the total of all the related object hashes of the threat chain. That is, the ROSH of a threat chain may be calculated as $$\text{ROSH} = Z1 + Z2 + Z3 + \ldots + Zn$$

Figure 6:
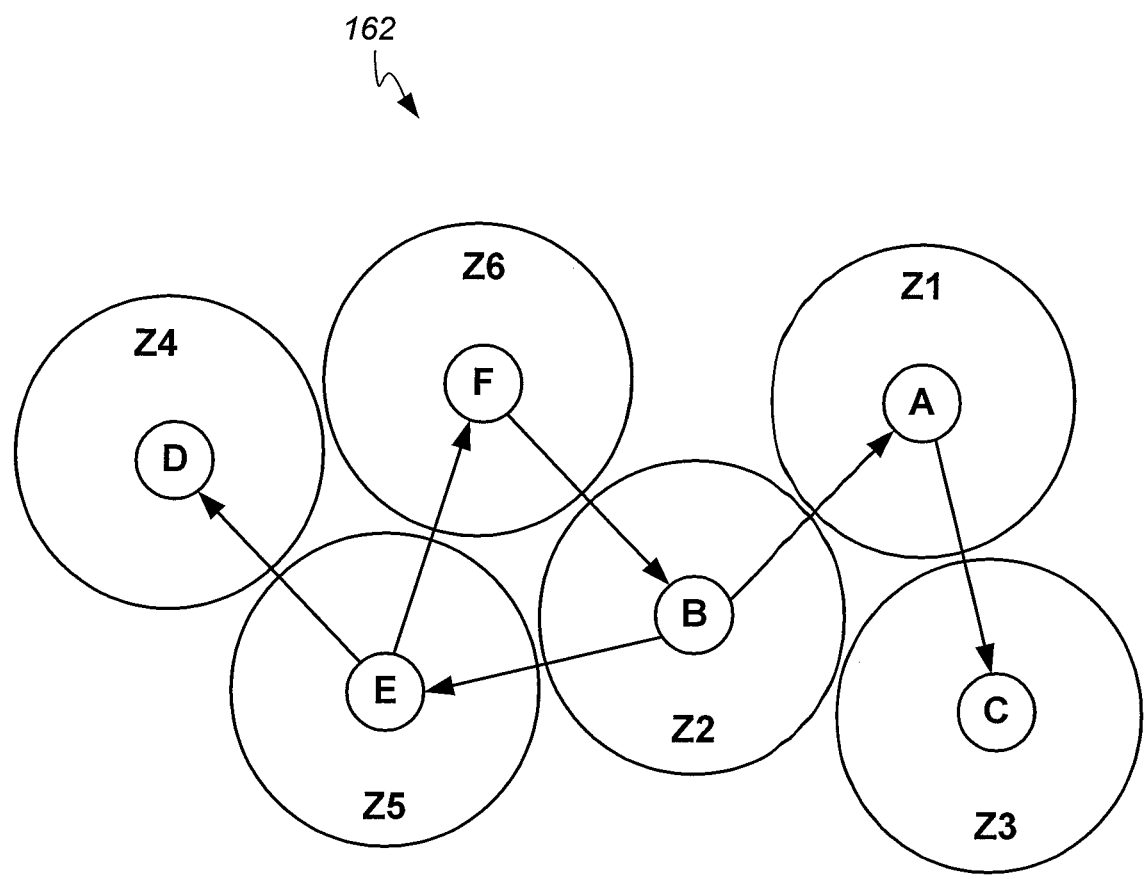

In the example of FIG. 6, the related object hashes Z1 to Z6 are calculated for objects A to F, respectively. The ROSH of the threat chain 162 may thus be calculated as the sum of the related object hashes Z1, Z2, Z3, Z4, Z5, and Z6.

As can be appreciated, a relative object hash of a particular object is not simply the hash of the particular object itself. Rather, the relative object hash of the particular object takes into account the hashes of other objects that are related to the particular object. This advantageously provides context to the particular object. The ROSH of a threat chain thus allows for detection of complex cyber threats that involve multiple objects, wherein an individual object by itself may or may not be malicious.

Furthermore, unlike tree-based approaches, a ROSH is not unidirectional and does not have to be calculated in a particular direction or from a particular node. The ROSH of a threat chain will be the same regardless of which object is processed first, making the ROSH especially advantageous in applications involving processing of cyber threat intelligence.

Figure 7:
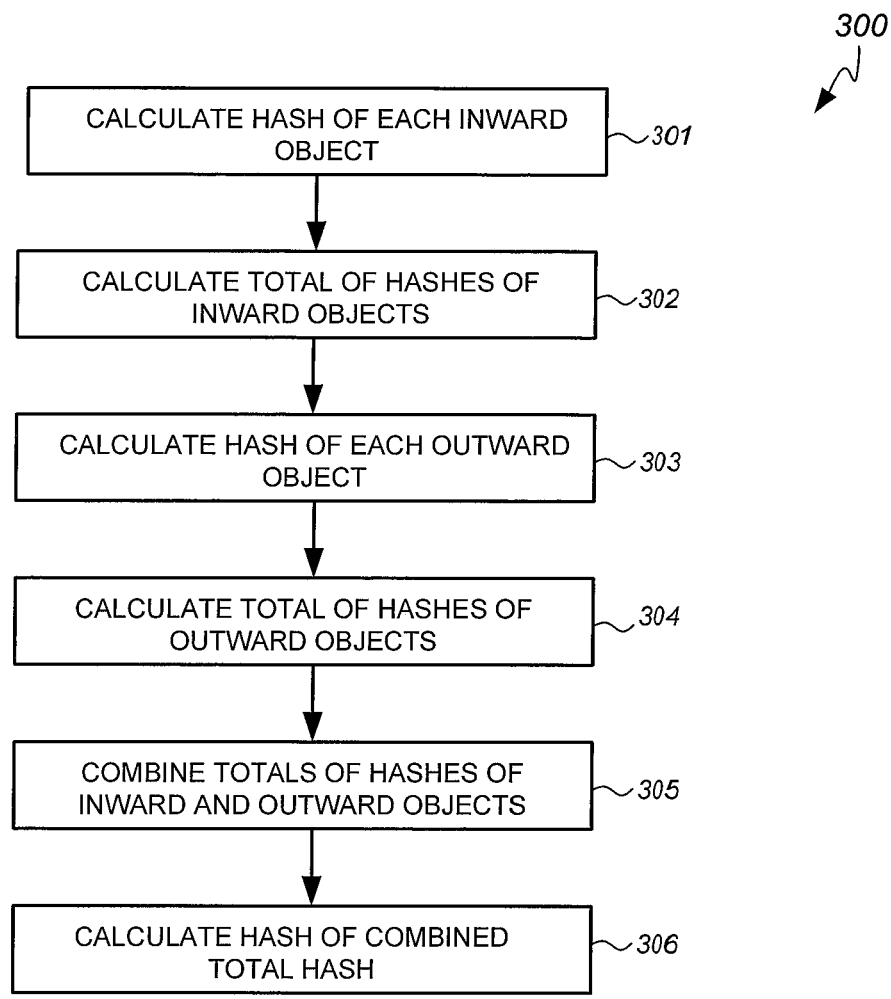
FIG. 7 shows a flow diagram of a method of generating a related object hash of an object in accordance with an embodiment of the present invention.

FIG. 7 shows a flow diagram of a method 300 of generating a related object hash of an object in accordance with an embodiment of the present invention. The method 300 may be performed by the ROSH module 191 to generate a related object hash of an object of a threat chain.

In the example of FIG. 7, a related object hash is calculated for a particular object. The hash of each inward object (i.e., an object with an inward relationship with the particular object) relative to the particular object is calculated (step 301). The total of hashes of the inward objects is calculated (step 302). For example, the hashes of the inward objects may be added together to generate a sum.

The hash of each outward object (i.e., an object with an outward relationship with the particular object) relative to the particular object is calculated (step 303). The total of hashes of the outward objects is calculated (step 304). For example, the hashes of the outward objects may be added together to generate a sum.

The total inward hash (i.e., total of hashes of the inward objects) is combined with the total outward hash (i.e., total of hashes of the outward objects) to generate a combined total hash (step 305). For example, the total inward hash and the total outward hash may be concatenated together as a single numerical value. The related object hash of the particular object may be generated by applying a hash function on the combined total hash (step 306).

Figure 8:
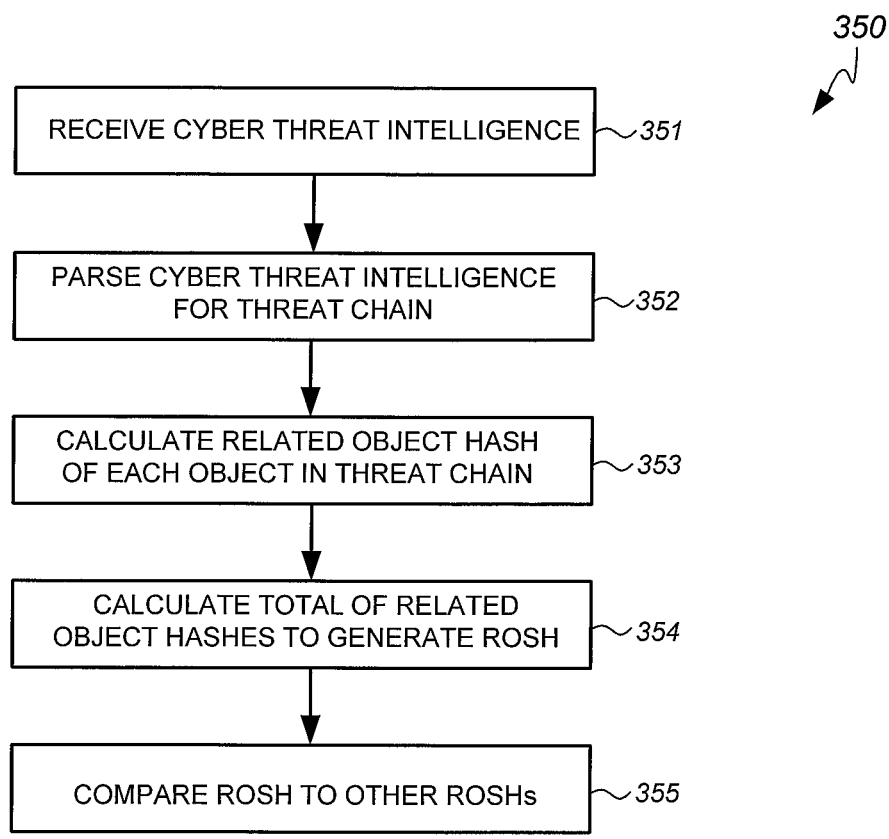
FIG. 8 shows a flow diagram of a method of combating cyber threats in accordance with an embodiment of the present invention.

FIG. 8 shows a flow diagram of a method 350 of combating cyber threats in accordance with an embodiment of the present invention. The method 350 may be performed by the analysis system 160 of FIG. 1 in conjunction with a cybersecurity module 180.

In the example of FIG. 8, the analysis system 160 receives cyber threat intelligence from a cybersecurity module 180 (step 351). The cyber threat intelligence may be received as part of a cybersecurity report 181 that is provided by the cybersecurity module 180 to the analysis system 160 over the Internet, for example. The analysis system 160 parses the cyber threat intelligence to extract a threat chain (352). The threat chain may comprise a plurality of objects and plurality of edges connecting the objects, with each edge describing a relationship between two objects as described in the cyber threat intelligence.

The analysis system 160 generates a related object hash of each object of the threat chain (step 353), and generates the ROSH of the threat chain by calculating the total of the related object hashes (step 354). The ROSH may be compared to other ROSHs to detect cyber threats (step 355). For example, when the ROSH is malicious, the ROSH may be clustered with other malicious ROSHs. A target ROSH may be compared with the cluster of malicious ROSHs to determine if the target ROSH is malicious. As another example, a locally-stored cluster of malicious ROSHs may be consulted before sending a query to the analysis system 160 for a target ROSH. Yet another example, the ROSH of the threat chain may be used as a pattern to identify other instances of the threat chain.

Figure 9:
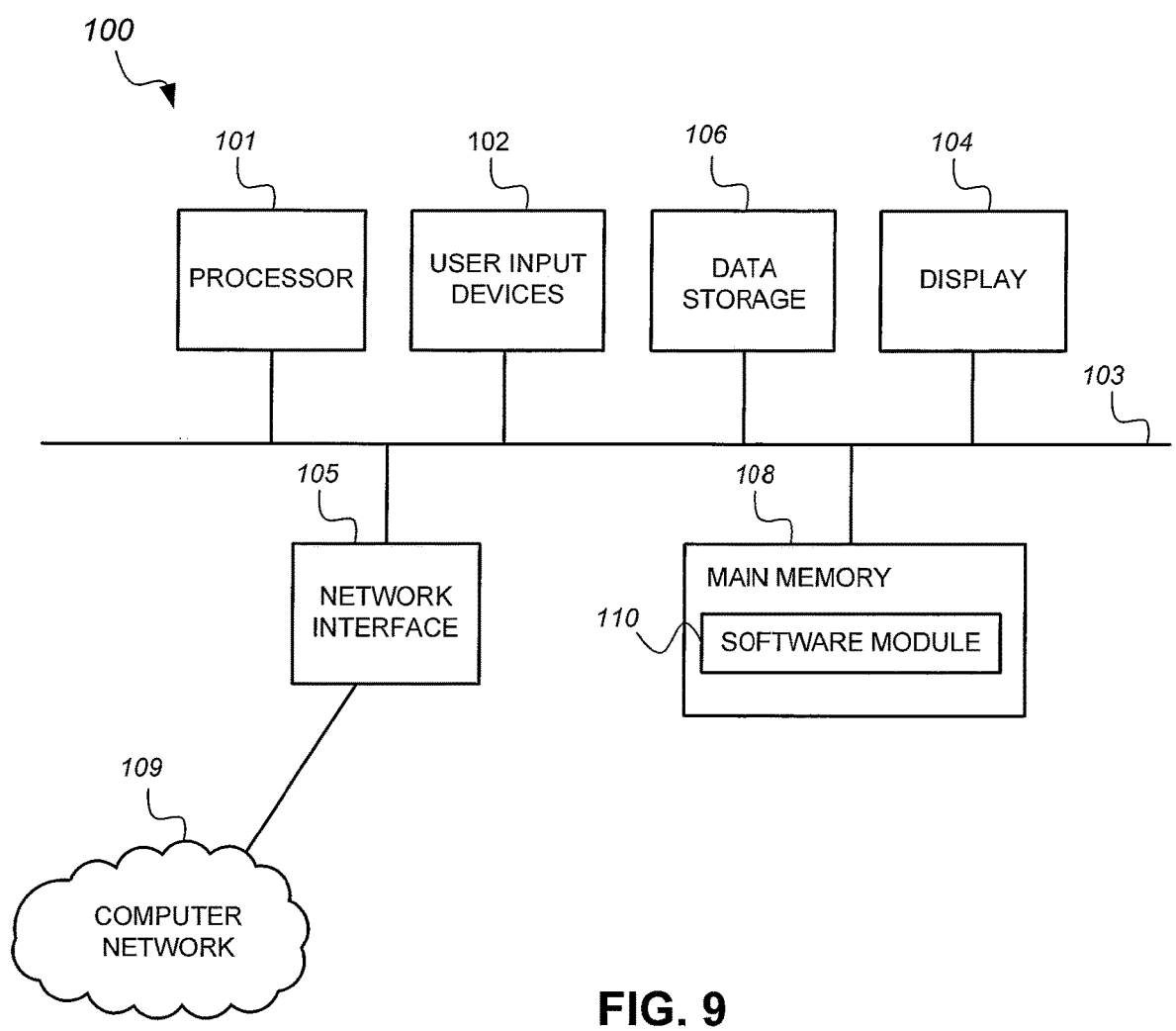
FIG. 9 shows a logical diagram of a computer system that may be employed with embodiments of the present invention.

Referring now to FIG. 9, there is shown a logical diagram of a computer system 100 that may be employed with embodiments of the present invention. The computer system 100 may be employed as a cyber threat intelligence analysis system or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a cyber threat intelligence analysis system, the software modules 110 comprise a threat chain extractor and an ROSH module.

Systems and methods for combating cyber threats using a related object sequence hash have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting against cyber threats, the method comprising:
    receiving a cyber threat intelligence of a cyber threat;
    parsing the cyber threat intelligence for a threat chain, the threat chain comprising a plurality of objects involved in the cyber threat and edges that link objects of the plurality of objects, each of the edges representing a relationship between two objects of the plurality of objects as described in the cyber threat intelligence;
    for each object of the plurality of objects, calculating a related object hash of an object of the plurality of objects from hashes of objects that are linked to the object;
    generating a related object sequence hash of the threat chain by calculating a total of related object hashes of the plurality of objects; and
    comparing the related object sequence hash of the threat chain to another related object sequence hash,
    wherein calculating the related object hash of the object comprises:
    calculating a total of hashes of objects that have an inward relationship with the object;
    calculating a total of hashes of objects that have an outward relationship with the object;
    generating a combined total by combining the total of hashes of objects that have an inward relationship with the object and the total of hashes of objects that have an outward relationship with the object; and
    calculating, using a hash function, a hash of the combined total.

2. The method of claim 1, wherein the other related object sequence hash is malicious.

3. The method of claim 2, further comprising:
    performing a corrective action in response to the other related object sequence hash matching the related object sequence hash of the threat chain.

4. The method of claim 1, wherein the hash function is a cryptographic hash function.

5. The method of claim 1, wherein the hash function is the Secure Hash Algorithm 1 (SHA1) function.

6. The method of claim 1, wherein the cyber threat intelligence is received in a first computer and receiving the cyber threat intelligence comprises:
   detecting the cyber threat in a second computer; and
   sending a report from the second computer to the first computer over the Internet, the report including the cyber threat intelligence.

7. The method of claim 6, further comprising:
   displaying the threat chain as a graph on a display screen of the first computer.

8. A system for combating cyber threats, the system comprising:
   a first computer that is configured to detect a cyber threat, generate a cyber threat intelligence of the cyber threat, and forward the cyber threat intelligence over a computer network; and
   a second computer that is configured to receive the cyber threat intelligence over the computer network, parse the cyber threat intelligence for a threat chain, calculate a related object hash of each object of a plurality of objects that are involved in the cyber threat and included in the threat chain, generate a related object sequence hash of the threat chain by calculating a total of related object hashes of the plurality of objects, and compare the related object sequence hash of the threat chain to another related object sequence hash,
   wherein, for each object of the plurality of objects, the related object hash of an object of the plurality of objects is calculated from hashes of objects that are linked to the object as described in the cyber threat intelligence,
   wherein the second computer is configured to calculate the related object hash of the object by:
   calculating a total of hashes of objects that have an inward relationship with the object;
   calculating a total of hashes of objects that have an outward relationship with the object;
   generating a combined total by combining the total of hashes of objects that have an inward relationship with the object and the total of hashes of objects that have an outward relationship with the object; and
   calculating, using a hash function, the hash of the combined total.

9. The system of claim 8, wherein the other related object sequence hash is malicious.

10. The system of claim 9, wherein the first computer is further configured to perform a corrective action in response to the related object sequence hash of the threat chain matching the other related object sequence hash.

11. The system of claim 8, wherein the hash function is a cryptographic hash function.

12. The system of claim 8, wherein the hash function is the Secure Hash Algorithm 1 (SHA1) function.

13. The system of claim 8, wherein the second computer is configured to display the threat chain as a graph on a display screen of the second computer.

14. A method of combating cyber threats, the method comprising:
   receiving a cyber threat intelligence of a cyber threat, the cyber threat intelligence including a threat chain that comprises a plurality of objects that are involved in the cyber threat and relationships between objects of the plurality of objects;
   for each object of the plurality of objects, calculating a related object hash of an object of the plurality of objects by applying a hash function on one or more objects that are related to the object as described in the cyber threat intelligence; and
   generating a related object sequence hash of the threat chain by calculating a total of related object hashes of the plurality of objects,
   wherein calculating the related object hash of the object by applying the hash function on one or more objects that are related to the object as described in the cyber threat intelligence comprises:
   calculating, using the hash function, hashes of objects that have an inward relationship with the object;
   generating a total inward hash by calculating a total of the hashes of the objects that have an inward relationship with the object;
   calculating, using the hash function, hashes of objects that have an outward relationship with the object;
   generating a total outward hash by calculating a total of the hashes of the objects that have an outward relationship with the object;
   generating a combined total by combining the total inward hash and the total outward hash; and
   applying the hash function on the combined total.

15. The method of claim 14, wherein the hash function is a cryptographic hash function.

16. The method of claim 14, wherein receiving the cyber threat intelligence of the cyber threat comprises:
   detecting the cyber threat in a first computer;
   forwarding the cyber threat intelligence from the first computer to a second computer over a computer network; and
   receiving the cyber threat intelligence in the second computer.

17. The method of claim 16, further comprising:
   comparing the related object sequence hash of the threat chain to another related object sequence hash.

* * * * *